United States Patent [19]
Haugen et al.

[11] Patent Number: 5,174,383
[45] Date of Patent: Dec. 29, 1992

[54] APPARATUS AND METHOD FOR CONTROLLING THE INTRODUCTION OF CHEMICAL FOAMANT INTO WATER STREAM IN FIRE-FIGHTING EQUIPMENT

[75] Inventors: Roger A. Haugen, Cokato; Michael D. O'Dougherty, Maplewood, both of Minn.

[73] Assignee: Hypro Corporation, St. Paul, Minn.

[21] Appl. No.: 241,462

[22] Filed: Sep. 8, 1988

[51] Int. Cl.⁵ ............................................. A62C 5/02
[52] U.S. Cl. .................................. 169/15; 169/13; 169/44
[58] Field of Search ............... 169/44, 49, 5, 13–16, 169/24; 222/57; 239/61, 343; 137/88, 92, 3

[56] References Cited

U.S. PATENT DOCUMENTS

| | | | |
|---|---|---|---|
| 4,324,294 | 4/1982 | McLoughlin et al. | 169/13 |
| 4,474,680 | 10/1984 | Kroll | 169/15 X |
| 4,526,234 | 7/1985 | Little | 169/15 |
| 4,554,939 | 11/1985 | Kern | 222/57 X |
| 4,830,589 | 5/1989 | Pareja | 417/539 |

FOREIGN PATENT DOCUMENTS 296652 12/1988 European Pat. Off. ............. 169/13
3038334 10/1982 Fed. Rep. of Germany ........ 239/61

Primary Examiner—Margaret A. Focarino
Assistant Examiner—James M. Kannofsky
Attorney, Agent, or Firm—Haugen and Nikolai

[57] ABSTRACT

Fire-fighting apparatus and the method of using of same in which water from a supply source is adapted to be pumped at high pressure and predetermined flow rates through a fire hose and in which metered quantities of a chemical foamant are injected into the fire hose and mixed with the water stream to increase the effectiveness of the mixture as a fire extinguishant. A special purpose computer module is configured to monitor the flow rate of the water through the hose, the level of chemical foamant in a supply reservoir and the speed of the positive displacement pump used to inject the foamant. The computer then determines an appropriate speed for the pump and provides a closed-loop control signal to the pump's drive motor to maintain a desired chemical injection rate.

8 Claims, 2 Drawing Sheets

APPARATUS AND METHOD FOR CONTROLLING THE INTRODUCTION OF CHEMICAL FOAMANT INTO WATER STREAM IN FIRE-FIGHTING EQUIPMENT

BACKGROUND OF THE INVENTION

I. Field of the Invention

This invention relates generally to an apparatus and method for fighting fires, and more particularly to a system in which a prescribed quantity of a fire extinguishant in the form of a liquid chemical foamant, is introduced into the main water stream being directed at the fire, such that the resulting foam mixture blankets and smothers the combustible material to limit its exposure to oxygen and to raise the combustion point for that fuel.

II. Discussion of the Prior Art

In combating fires, the application of copious amounts of water to the site is effective to raise the temperature at which combustion takes place. That is, by soaking the combustible materials exposed to the fire with water heat from the fire must first evaporate the water before the temperature of the fuel can be raised to its flash point. In fighting large fires, e.g., forest fires and the like, the application of water alone is oftentimes ineffective because of the size of the area involved and the potential high temperatures encountered. Huge quantities of water must be dropped from aircraft or pumped by ground equipment from lakes and streams if the fire is to be extinguished. This is especially true given the fact that fires often spread subterraneously burning deep in the duff or moss.

Various water additives are now on the market for enhancing the fire extinguishing characteristics of water alone. Specifically, various chemical foamants and surfactants, when added to the water being dumped or sprayed onto the fire scene, creates a foam tending to coat the surface of combustible fuels and deprive them of the oxygen needed for combustion. Moreover, the surfactant, being a wetting agent, permits greater penetration of the treated water into the duff or moss for extinguishing subterraneous fires. When products such as these are applied on fuel, the foaming action allows the mixture to cling to the fuel surfaces, covering it with a layer of material containing more than 99% water. The surfactant action of the additive allows the water to penetrate any oily coatings on the fuel surface which, in turn, permits the water to be absorbed better into the fuel.

Because of cost considerations, it is desirable that the quantity of the surfactant or foamant introduced into the water stream be precisely controlled so as to provide a desired degree of foaming action, but no more. Wormald Canada, Inc. of Ottawa, Ontario, Canada, sells a foamant fire extinguishant under the trademark SILV-EX which it recommends be induced into the water stream so as to comprise 0.7% of flow. Chemical Industries, Inc. of Phoenix, Ariz., sells a concentrate combining foaming and wetting agents under the trademark, FIRE-TROL ® FIREFOAM ™, which it recommends be applied at 0.2%–0.5% of flow.

In the past, attempts have been made to introduce the chemical foamant into a water stream by using a venturi-type injector. The ability to maintain a desired concentration of chemical in the output stream is difficult because of variations in pressures and flow rates through the venturi and changes in viscosity of the chemical being introduced.

The present invention provides a method and an apparatus for injecting the chemical additive to the water stream in a precise proportion before it is sprayed or dispensed out the end of the fire hose. That is to say, because the system of the present invention includes a computer-based feedback loop which monitors the supply water flow rate and a positive-displacement, adjustable-stroke injector pump whose speed is controlled, the chemical additive is injected at an appropriate rate to maintain a desired concentration in the sprayed mixture. As such, the chemical additive is not needlessly wasted. Also, by utilizing the concentrations recommended by the manufacturers, less damage to the environment results from the application of the fire extinguishant.

SUMMARY OF THE INVENTION

In accordance with the present invention, raw water is pumped from a suitable supply which may be a minicipal hydrant, a truck-borne water tank, or alternatively, a lake or stream. Where required, a large capacity water pump is used to feed water at a desired pressure and flow rate through a fire hose which is then directed at the area to be wetted down. The liquid chemical additive, usually a combination of foamants and wetting agents, is stored in a suitable chemical supply tank whose outlet is connected to the inlet of a positive displacement pump which is arranged to be driven by an electric motor at an appropriate speed such that the output of the chemical pump, when added to the water stream in the fire hose, produces a desired concentration in the mixture being sprayed. The water flow rate is monitored by a suitable flow meter and the electrical signal exiting the flow meter is applied as an input to a microprocessor-based control module. Other inputs to this module include a signal from the chemical tank relating to the level of concentrate remaining in the tank and a signal from the chemical pump's drive pulley indicative of its shaft speed. Using these signals as inputs and knowing such parameters as the size of the fire hose being used, the specified or desired concentration of the water/additive mixture recommended by its manufacturer, the control system issues a speed controlling signal to the motor driving the chemical pump. In that each revolution of the shaft of the positive displacement chemical pump causes a premeasured quantity of chemical additive to be drawn from the chemical supply tank and injected into the water stream, by controlling the motor speed which drives the pump, the concentration can be maintained.

OBJECTS

It is accordingly a principal object of the present invention to provide an improved apparatus and method for dispensing fire extinguishant materials.

Another object of the invention is to provide a portable system for applying a chemical foamant to the source of the fire in which metered quantities of a chemical concentrate are added to a raw water stream in a precise proportion to produce an effective fire extinguishant foam without overuse of the chemical additive.

Yet another object of the invention is to provide a method for controlling the introduction of a chemical additive to a stream of water used in fire-fighting applications in which the flow rate of water is monitored and the rate of chemical addition is controlled as a function of observed water flow rate.

DESCRIPTION OF THE DRAWINGS

The foregoing objects and advantages of the invention will become apparent to those skilled in the art from the following detailed description of the preferred embodiment, especially when considered in conjunction with the accompanying drawings in which.

DESCRIPTION OF THE PREFERRED EMBODIMENT

Figure 1:
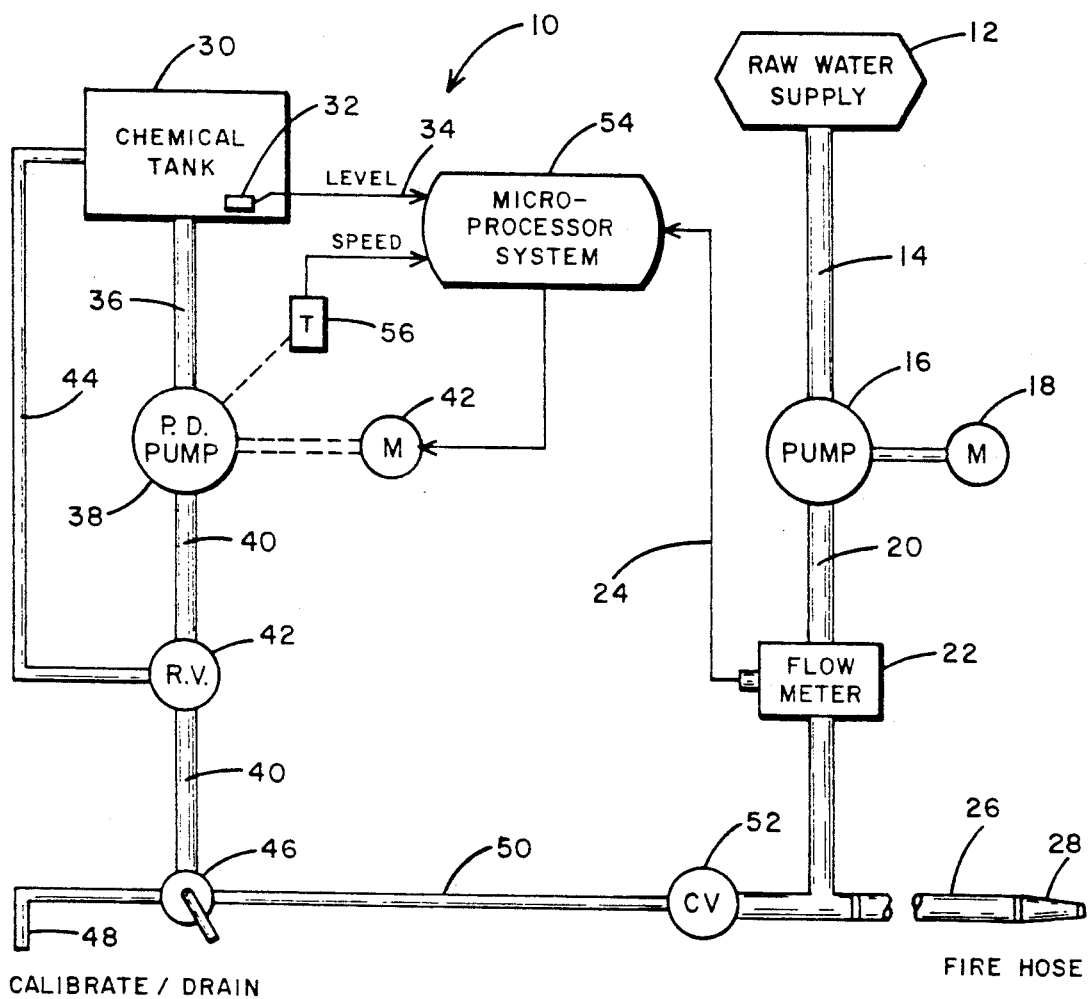
FIG. 1 comprises a schematic mechanical/electrical representation of the fire-fighting system in accordance with the present invention.

Referring to FIG. 1, the fire-fighting system in accordance with the present invention is indicated generally by numeral 10. It is seen to include a supply of raw water 12 which may, for example, be a truck-mounted tank containing water or, alternatively, may be a lake, a stream or a municipal hydrant. The water is fed through a hose or other conduit 14 to the inlet of a high pressure, high flow rate pump 16 driven by a suitable prime mover 18 which may be either an electrical motor or an internal combustion engine. The outlet of the pump 16 is connected by a suitable conduit 20 to a flow meter device 22 which is operative to produce an electrical signal on line 24 proportional to the volume rate of flow of fluid through the conduit 20. After passing through the flow meter 22, the water being pumped ultimately exits the fire hose 26, via nozzle 28.

The chemical surfactant/foamant is in liquid form and may be contained in a chemical supply tank which is indicated in the drawing by numeral 30. Also contained within the tank 30 is a float mechanism 32 or other type of level sensing device which is capable of producing an output signal on line 34 indicative that the amount of chemical remaining in the tank has dropped below some preset level.

The chemical supply tank 30 is coupled by a hose or other suitable conduit 36 to the inlet port of a positive displacement pump 38. The pump 38 preferably comprises the type of device described in the U.S. patent application Ser. No. 07/241,461 to Pareja, filed Sep. 8, 1988, now U.S. Pat. No. 4,830,589, and entitled "VARIABLE STROKE POSITIVE DISPLACEMENT PUMP". That device comprises a multiple piston, positive displacement pump whose piston stroke can be readily adjusted to allow a change in the volume of chemical additive ejected on each compression stroke of each of the pistons. Because the constructional features of that pump are fully described in the aforereferenced application, it is not deemed necessary to describe the internal construction and operating features of the pump 38. Suffice it to say, the amount of chemical additive drawn from the tank 30 and pumped through conduit 40 is directly proportional to the stroke volume of each cylinder and to the speed at which the pump 38 is driven by the electrical motor 42.

Connected in series with the conduit 40 is a pressure relief valve 42 which functions to return the chemical additive to the supply tank 30, via tubing 44, in the event that the selector valve 46 should be closed at the time that the pump 38 is operational.

The selector valve 46 may be either a manually or electrically operated valve capable of routing the liquid from the chemical tank 30 out a spigot 48 during calibration of the system or drain-down of the tank 30. In its alternate position, the selector valve 46 routes the chemical being pumped by positive displacement pump 38 through conduit 50 which is coupled through a check valve 52 to the inlet of the fire hose 26. The check valve 52 is effective to block the flow of raw water back through the conduit 50, the selector valve 46 and the conduit 40. Specifically, when the pressure in the fire hose 26 exceeds the pressure in conduit 50, the check valve 52 closes to prevent the backflow of raw water into the chemical supply portion of the system.

To control the rate at which the chemical from supply tank 30 is injected into the water stream exiting the fire hose 26, the apparatus of the present invention includes a microprocessor-based control system 54. The microprocessor involved is conventional in design. That is, it includes an instruction processor, an arithmetic logic unit and a compliment of RAM and ROM memory for storing a program of instructions and other operands necessary for executing such instructions and developing the requisite control signals for the drive motor 42. The microprocessor-based control system includes an input port for receiving electrical signals from the flow meter 22 on line 24 indicative of the rate of flow of the raw water from the supply 12 through the hose 20. The microprocessor control system 54 also receives a speed signal from a tachometer 56 which is coupled to the drive shaft of the pump 38. The output from the level sensor 32 on line 34 is also applied to the microprocessor control system 54 and serves to shut down the injector pump 38 in the event that the chemical tank 30 is drained of its supply of additive.

Those skilled in the art will recognize that the flow meter 22 may be arranged to provide a digital output on line 24 leading to the microprocessor or, alternatively, the microprocessor based control system may also include an A/D converter and a D/A converter for interfacing it to the flow meter 22 and to the electrical motor 42 and tachometer 56. The microprocessor based control system will also typically include a keyboard entry device or other equivalent structure for introducing various parameters, such as hose sizes, chemical injection rates and pump calibration data. It may also include digital displays for indicating to an operator various performance characteristics, such as totalized flow, current flow rate in gallons-per-minute, amount of chemical additive remaining, etc.

Figure 2:
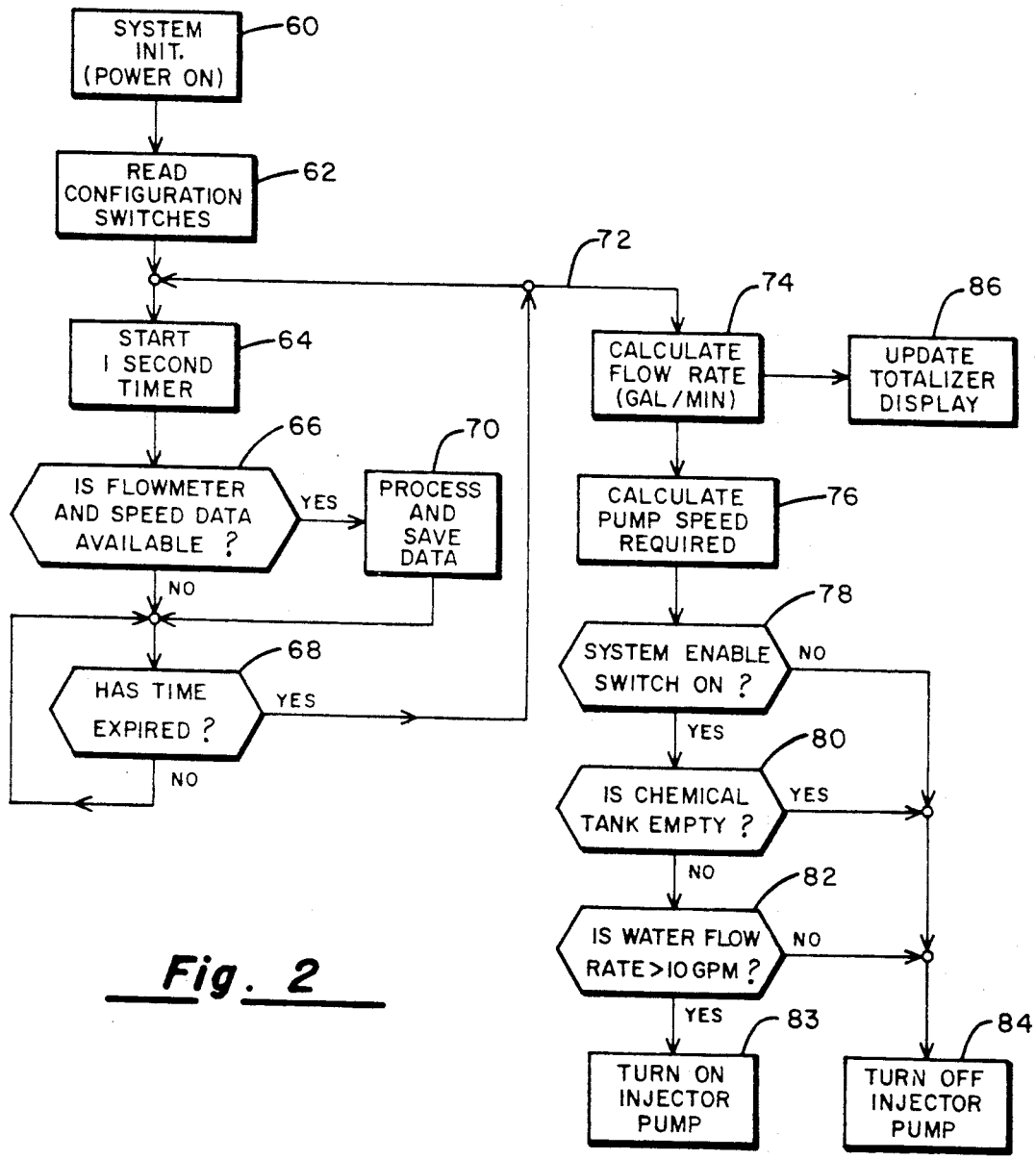
FIG. 2 is a software flow chart of the control algorithm utilized in the system of FIG. 1.

Referring next to FIG. 2, there is shown a software flow diagram of the control algorithm implemented in the microprocessor control system 54 of FIG. 1. Those skilled in the art of programming a microprocessor will be in a position to prepare the detailed source code or machine code for a given microprocessor from what is disclosed in FIG. 2 of the drawings.

When power is first applied to the system and following the usual initialization steps for the type of microprocessor employed (block 60), the microprocessor reads the configuration switches (block 62). These configuration switches are operator set and are used to define the desired injection rate in terms of percent of total flow, the nominal water flow rate, and the hose size of the fire hose employed. These configuration switches are set at the time of initial calibration and remain so set until manually reconfigured.

Next, the microprocessor initiates a one second time interval (block 64) and on repetitive cycle time a test is made to determine whether data is available from the flow meter 22 and from the tachometer 56. This test is represented by block 66 in the flow diagram of FIG. 2. If the flow meter and speed data is not available, a further test is made to determine whether the one second time interval earlier initiated has expired (block 68). If not, the operation continues until such time as the one second timer has timed out. At that point, a further one second time interval is initiated as indicated by the "Y" (yes) flow line exiting the decision block 68 and reentering the block 64.

The flow meter and speed data accumulated during each one second interval is processed and stored (block 70) and following an indication that the one second interval has expired, the control follows flow path 72 and a calculation is made of the flow rate of the water pumped through the hose 26 in terms of gallons per minute (block 74). The processor also calculates the injector pump speed required for that flow rate in order that the desired concentration of chemical foamant will result in the output flow from the hose 26.

The motor 42 controlling the injector pump 38 will then be turned on and driven at the computed pump speed provided three tests are satisfied. The three tests are identified by decision blocks 78, 80 and 82 in FIG. 2. Thus, for the chemical injector pump to be driven at the computed speed, it must be determined that the "system enable" switch is on, that the chemical storage tank 30 is not empty and that the water flow rate from supply 12 exceeds ten gallons per minute. On the other hand, if the system enable switch is off, the chemical tank 30 is empty or the water flow rate is less than ten gallons per minute, the chemical injector pump motor will not be driven (block 84).

This routine is repeated at one second intervals and a running total of water run through the hose 26 is maintained and displayed as represented by block 86. In this way, fire fighting personnel can be aware of the total number of gallons poured into, say, a burning building so that consideration can be given to the weight factor and the likelihood that the building's floor could collapse.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. Apparatus for injecting a foamant chemical into a water stream used in extinguishing fires comprising, in combination:
    (a) water supply means for normally delivering water at varying flow rates through a hose member;
    (b) means for monitoring the flow of water through said hose member and producing an electrical signal related to the rate of water flow through said hose member;
    (c) a supply tank for containing a supply of a liquid chemical foamant;
    (d) positive displacement piston pump means having a variable stroke and, having an input port coupled to said supply tank, an output port and pump speed sensing means for sensing the speed at which said pump is being driven;
    (e) means coupling said output port of said pump to said hose member;
    (f) a variable speed electrical motor means for driving said pump means at a speed determined by a control signal applied thereto;
    (g) computing means coupled to receive said electrical signal relating to flow, and a signal from said pump speed sensing means, said computing means determining the speed at which said motor should be driven to introduce a metered quantity of said chemical foamant into said hose member, depending on the rate of flow of water through said hose member;
    (h) means connecting said computing means in driving relation to said motor means; and
    (i) calibration means for calibrating the actual pump output in relation to said metered quantity.

2. The apparatus as in claim 1 wherein the means coupling said output port of said pump to said hose member includes a check valve for preventing water from said water supply means from reaching said pump means.

3. The apparatus as in claim 1 and further including means for sensing the level of the liquid foamant in said supply tank, said level sensing means providing a further control input to said computing means.

4. The apparatus as in claim 3 further comprising means for shutting down said pump in response to the sensing of no liquid foamant in said supply tank by said means for sensing the foamant level.

5. A method of operating a fire-fighting system, comprising the steps of:
    (a) providing a primary supply of water;
    (b) delivering water from the supply to the site of a fire through a fire hose;
    (c) monitoring the flow rate of water flowing from said supply through said fire hose;
    (d) providing a supply of a chemical foamant;
    (e) computing the appropriate quantity of said chemical foamant to be introduced into the water stream from an instantaneous flow rate of said water; and
    (f) introducing controlled, time variable quantities of said chemical foamant into the water flowing through said fire hose by means of a variable-speed, motor-driven, positive-displacement pump in fluid communication with said supply of chemical foamant and said fire hose wherein the driven speed of the variable-speed motor is time varied as a function of the water flow rate through said introduction and wherein the positive displacement pump is a piston pump in which the piston stroke is adjustable to establish a precise predetermined volume of chemical foamant added to the water flowing in said fire hose per cycle of said pump.

6. The method of claim 5 further comprising the step of preventing the introduction of chemical foamant when said flow rate of said water is less than a predetermined minimum.

7. The method of claim 5 further comprising the steps of monitoring the supply of said chemical foamant and shutting down said pump means when said supply is exhausted.

8. The method of claim 5 further comprising the step of varying the output of said pump with respect to said computed quantity.

* * * * *